US011210710B2

(12) United States Patent
Turner et al.

(10) Patent No.: US 11,210,710 B2
(45) Date of Patent: Dec. 28, 2021

(54) TECHNIQUES FOR INSERTING ADVERTISING CONTENT INTO DIGITAL CONTENT

(71) Applicant: WP Company LLC, Washington, DC (US)

(72) Inventors: Jeffrey Mark Turner, Arlington, VA (US); Aram Jason Zucker-Scharff, Long Island City, NY (US)

(73) Assignee: WP COMPANY LLC, Washington, DC (US)

(*) Notice: Subject to any disclaimer, the term of this patent is extended or adjusted under 35 U.S.C. 154(b) by 109 days.

(21) Appl. No.: 16/248,550

(22) Filed: Jan. 15, 2019

(65) Prior Publication Data

US 2020/0226642 A1 Jul. 16, 2020

(51) Int. Cl.
*G06Q 30/02* (2012.01)
(52) U.S. Cl.
CPC ................. *G06Q 30/0277* (2013.01)
(58) Field of Classification Search
CPC .................................................. G06Q 30/0277
USPC ........... 705/14.73, 37, 14.69, 14.54; 725/32; 715/234
See application file for complete search history.

(56) References Cited

U.S. PATENT DOCUMENTS

| | | | |
|---|---|---|---|
| 9,293,042 B1* | 3/2016 | Wasserman | H04N 21/42202 |
| 2001/0014876 A1* | 8/2001 | Miyashita | H04L 67/306 |
| | | | 705/37 |
| 2008/0133311 A1* | 6/2008 | Madriz Ottolina | G06Q 30/02 |
| | | | 705/14.69 |
| 2009/0133053 A1* | 5/2009 | Badt, Jr | H04N 21/23424 |
| | | | 725/32 |
| 2009/0304198 A1* | 12/2009 | Herre | G10L 19/008 |
| | | | 381/66 |

(Continued)

FOREIGN PATENT DOCUMENTS

| | | | |
|---|---|---|---|
| WO | WO-2008124752 A1 * | 10/2008 | ......... G06Q 30/0269 |
| WO | WO-2017/048496 | 3/2017 | |
| WO | WO-2018/134569 | 7/2018 | |

OTHER PUBLICATIONS

Jeff Rum, 18 Digital Strategy Tips to Consider for 2018 (Year: 2018).*

(Continued)

*Primary Examiner* — Tarek Elchanti
(74) *Attorney, Agent, or Firm* — Wilmer Cutler Pickering Hale and Dorr LLP

(57) ABSTRACT

Techniques for inserting advertising content into digital content are disclosed. The system may determine a compatibility between advertising content and digital content, determine candidate advertising content and candidate digital content using the determined compatibility, determine that the candidate digital content includes an advertising zone specifying an area where advertising content may be inserted, determine that an advertising slot of the candidate advertising content matches the advertising zone, and select digital content from the candidate digital content. The system may further select advertising content from the candidate advertising content, and combine selected digital content and selected advertising content by inserting the selected advertising content into the advertising zone.

22 Claims, 9 Drawing Sheets

(56) References Cited

U.S. PATENT DOCUMENTS

| | | | |
|---|---|---|---|
| 2010/0312608 A1* | 12/2010 | Shan | G06Q 30/0255 |
| | | | 705/14.54 |
| 2011/0022470 A1 | 1/2011 | Varadarajan et al. | |
| 2011/0238507 A1* | 9/2011 | Ben-Rubi | G06Q 30/0277 |
| | | | 705/14.73 |
| 2014/0331119 A1* | 11/2014 | Dixon | G06Q 30/02 |
| | | | 715/234 |
| 2015/0234542 A1 | 8/2015 | Kirillov | |

OTHER PUBLICATIONS

Josh Steimle, What is Content Marketing?, 2014 (Year: 2014).*
WashpostPR, "RED Launches New Tool for Ad Managment on Audio, Rhapsochord," The Washington Post, Jul. 9, 2018 (1 page) last downloaded from https://www.washingtonpost.com/pr/wp/2018/07/09/red-launches-new-tool-for-ad-management-on-audio-rhapsochord/.
Sarah Sluis, "Washington Post Builds Tech That Dynamically Inserts Ads into Podcasts," Jul. 9, 2018, last downloaded from https://adexchanger.com/podcast/washington-post-builds-tech-that-dynamically-inserts-ads-into-podcasts/ (4 pages).
International Search Report dated Mar. 30, 2020 received in related PCT/US20/13511 filed Jan. 14, 2020 (9 pages).

* cited by examiner

TECHNIQUES FOR INSERTING ADVERTISING CONTENT INTO DIGITAL CONTENT

FIELD OF THE DISCLOSURE

The present disclosure generally relates to data processing associated with digital content, and in particular, data processing with respect to digital audio and video content.

BACKGROUND OF THE DISCLOSURE

Digital content, such as audio and video content, is ubiquitously consumed. Indeed, the popularity of audio and video content and in particular, audio and video content that is viewed on a computing device, has advanced in concert with the rise in use of computing devices such as mobile phones, tablet computers, and laptops. Due to this increase in popularity, advertising within audio and video content is desired. For example, audio content such as a song, podcast, or audiobook may include advertising content inserted into the audio content at one or more time points. In another example, video content such as a television show or movie may include advertising content inserted into the video content at one or more time points.

In conventional systems, the insertion of advertising content into digital content can be challenging. For example, the insertion may be performed manually, and may therefore be a time consuming and inefficient process. In another example, the insertion may be automated, but may not be user-targeted or account for the digital content within which the advertising content is inserted (e.g., the digital content's context), which may limit advertising efficacy.

Conventional systems may also be player specific systems. For example, a player specific system may be a particular software application that allows for the playing of audio and/or video content. Such systems may provide advertising content insertion for digital content, but may not be easily applicable or flexible for use with other audio and/or video providers, non-compatible advertising content, or content management systems.

Therefore, a need may exist for systems and methods that allow for the insertion of advertising content into digital content and overcome shortcomings associated with conventional processes.

SUMMARY OF THE DISCLOSURE

In some embodiments of the present disclosure, a system for combining advertising content with digital content may comprise a memory storing instructions and a processor configured to execute the instructions. The instructions may comprise determining a compatibility between advertising content and digital content, determining candidate advertising content and candidate digital content using the determined compatibility, determining that the candidate digital content includes an advertising zone specifying an area where advertising content may be inserted, determining that an advertising slot of the candidate advertising content matches the advertising zone, selecting digital content from the candidate digital content, selecting advertising content from the candidate advertising content, and combining selected digital content and selected advertising content by inserting the selected advertising content into the advertising zone.

In some embodiments of the present disclosure, the combining may include stitching the selected advertising content and the selected digital content together at a specified time point of the selected digital content.

In some embodiments of the present disclosure, the selected digital content may be a podcast and the selected advertising content may be audio.

In some embodiments of the present disclosure, the instructions may further comprise determining that the advertising slot is a mid-content advertising slot.

In some embodiments of the present disclosure, the combining may comprise determining a first time point of the advertising zone at which to split the selected digital content into a first portion and a second portion.

In some embodiments of the present disclosure, the combining may comprise splitting the selected digital content at the first time point, inserting the selected advertising content between the first portion and the second portion, and stitching the selected advertising content to the first portion and the second portion to form combined content.

In some embodiments of the present disclosure, the combined content may be transmitted to a server.

In some embodiments of the present disclosure, the instructions may further include determining a transmission location for the combined content using destination data associated with the selected digital content.

In some embodiments of the present disclosure, the combined content may be formatted for transmission to the transmission location.

In some embodiments of the present disclosure, the digital content may be selected because it is targeted for advertising content.

In some embodiments of the present disclosure, a method for combining advertising content with digital content may comprise determining a compatibility between advertising content and digital content, determining candidate advertising content and candidate digital content using the determined compatibility, determining that the candidate digital content includes an advertising zone specifying an area where advertising content may be inserted, determining that an advertising slot of the candidate advertising content matches the advertising zone, selecting digital content from the candidate digital content, selecting advertising content from the candidate advertising content, and combining selected digital content and selected advertising content by inserting the selected advertising content into the advertising zone.

In some embodiments of the present disclosure, the combining may include stitching the selected advertising content and the selected digital content together at a specified time point of the selected digital content.

In some embodiments of the present disclosure, the selected digital content may be a podcast and the selected advertising content is audio.

In some embodiments of the present disclosure, the method may further comprise determining that the advertising slot is a mid-content advertising slot.

In some embodiments of the present disclosure, the combining may comprise determining a first time point of the advertising zone at which to split the selected digital content into a first portion and a second portion.

In some embodiments of the present disclosure, the combining may comprise splitting the selected digital content at the first time point, inserting the selected advertising content between the first portion and the second portion, and stitching the selected advertising content to the first portion and the second portion to form combined content.

In some embodiments of the present disclosure, the method may further include determining a transmission location for the combined content using destination data associated with the selected digital content.

In some embodiments of the present disclosure, the combined content may be formatted for transmission to the transmission location.

In some embodiments of the present disclosure, the digital content may be selected because it is targeted for advertising content.

In some embodiments of the present disclosure, a non-transitory processor readable storage media may store instructions for combining advertising content with digital content. The instructions may comprise determining a compatibility between advertising content and digital content, determining candidate advertising content and candidate digital content using the determined compatibility, determining that the candidate digital content includes an advertising zone specifying an area where advertising content may be inserted, determining that an advertising slot of the candidate advertising content matches the advertising zone, selecting digital content from the candidate digital content, selecting advertising content from the candidate advertising content, and combining selected digital content and selected advertising content by inserting the selected advertising content into the advertising zone.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

It should be noted that embodiments and examples of the present disclosure may refer to a particular kind of digital content, such as a podcast. However, it should be understood that all embodiments and examples of the present disclosure may be used with any type of digital content, including video content and other kinds of audio content, such as music and audiobooks, for example.

Figure 1:
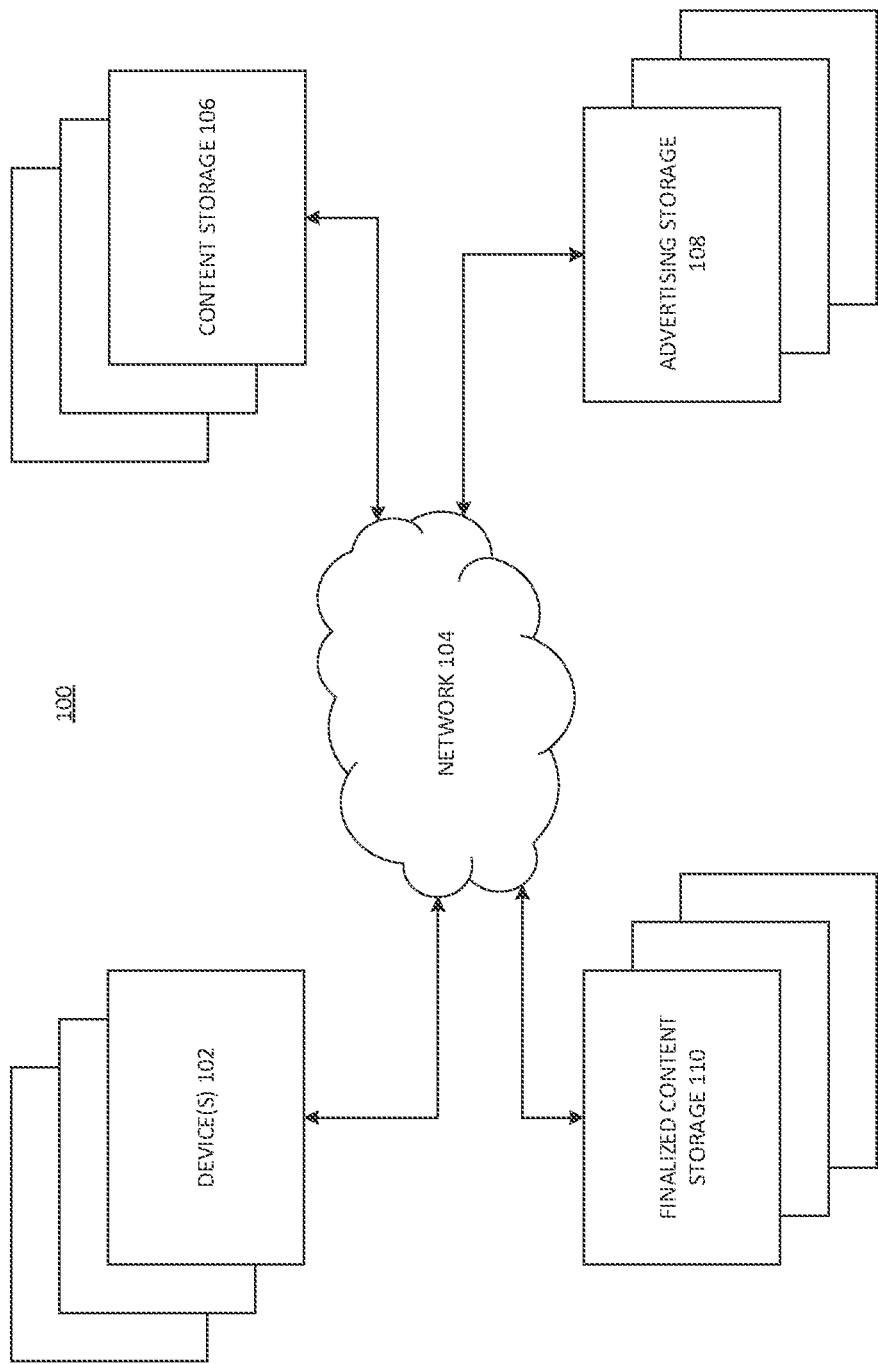
FIG. 1 shows an exemplary system according to some embodiments of the present disclosure.

FIG. 1 shows an exemplary system 100 according to some embodiments of the present disclosure. FIG. 1 includes a number of entities 102-110. However, it should be understood that any number of entities 102-110 may be present in system 100, and system 100 may also include other entities that are not shown in FIG. 1. Moreover, while entities 102, 106, 108, and 110 are shown as separate entities, it should be understood that one or more of them may be combined with each other into combined entities.

System 100 may include one or more devices 102. Device 102 may be, for example, a computer device, such as a server, desktop computer, laptop computer, tablet computer, mobile computer, mobile phone (e.g., PDA, cell phone, palmtop, etc.), mainframe, server, client, or any other type of special or general purpose computing device as may be desirable or appropriate for a given application or environment. Device 102 may include software for inserting advertising content into digital content in accordance with some embodiments of the present disclosure. Device 102 may be connected to other parts of system 100 via a network 104. Device 102 may be a cloud device that may interface with other computing devices via a cloud infrastructure.

Network 104 may, for example, be a wired, wireless, or combined wired and wireless network. Network 104 may be a cellular network, radio frequency (RF) network, Internet network, local area network, wide area network, or include a combination of one or more of these. Network 104 may provide a cloud infrastructure that allows for communication between number computing devices, such as one or more devices 102, as well as one or more of each of devices 106-110.

System 100 may include one or more content storage 106. Content storage 106 may be, for example, a computer device, such as a server, desktop computer, laptop computer, tablet computer, mobile computer, mobile phone (e.g., PDA, cell phone, palmtop, etc.), mainframe, server, client, or any other type of special or general purpose computing device as may be desirable or appropriate for a given application or environment. Content storage 106 may store digital content such as audio content and video content. The audio content may be in any appropriate file format, such as MP3 or WAV, for example. The video content may be in any appropriate file format, such as MP4 or WMV, for example. The audio content may, for example, be music, a podcast, an audio book, or the like. The video content may, for example, be a movie, television show, video clip, or the like. The audio and/or video content may be streaming content that is generated by content storage 106 or received by content storage 106 from a generating entity, such a content repository. Content storage 106 may be connected to other parts of system 100 via a network 104.

System 100 may include one or more advertising storage 108. Advertising storage 108 may be, for example, a computer device, such as a server, desktop computer, laptop computer, tablet computer, mobile computer, mobile phone (e.g., PDA, cell phone, palmtop, etc.), mainframe, server, client, or any other type of special or general purpose computing device as may be desirable or appropriate for a given application or environment. Advertising storage 108 may store advertising content for insertion into the digital content stored in content storage 106. For example, advertising storage 108 may store advertising content produced by one or more advertisers that are configured for insertion into audio content and/or video content. For example, the advertising content may include audio advertising content and/or video advertising content. Advertising storage 108 may be connected to other parts of system 100 via a network 104.

System 100 may include one or more finalized content storage 110. Finalized content storage 110 may be, for example, a computer device, such as a server, desktop computer, laptop computer, tablet computer, mobile computer, mobile phone (e.g., PDA, cell phone, palmtop, etc.), mainframe, server, client, or any other type of special or general purpose computing device as may be desirable or appropriate for a given application or environment. Finalized content storage 110 may store finalized content, such as audio and/or video content that has had advertising content inserted into it by device 102. The finalized content may be accessed by other entities for listening and/or viewing the finalized content.

Device 102 may interface with content storage 106 and/or advertising storage 108 via network 104. For example, device 102 may obtain video and/or audio content from content storage 106. Device 102 may also obtain video and/or audio advertising content from advertising storage 108. Device 102 may then insert such advertising content into the obtained video and/or audio content, generating finalized content. The finalized content may then be transmitted to finalized content storage 110, and thereafter distributed to other entities. Alternatively, other entities may access finalized content storage 110 for listening or viewing the finalized content. Alternatively, device 102 may directly distribute the finalized content to other entities, or other entities may access device 102 for listening or viewing the finalized content.

It should be understood that any number of devices 102, content storage 106, advertising storage 108, and finalized content storage 110 may be included in system 100. For example, system 100 may be scalable. As demand on system 100 increases, the number of one or more of devices 102, content storage 106, advertising storage 108, and finalized content storage 110 may be increased. Likewise, as the demand on system 100 decreases, the number of one or more of devices 102, content storage 106, advertising storage 108, and finalized content storage 110 may be decreased.

System 100 may optionally include one or more load balancers (not shown). For example, a load balancer may be provided to manage advertising content and digital content that is provided to the one or more devices 102, and monitor the amount of content being handled by the one or more devices 102.

Figure 2:
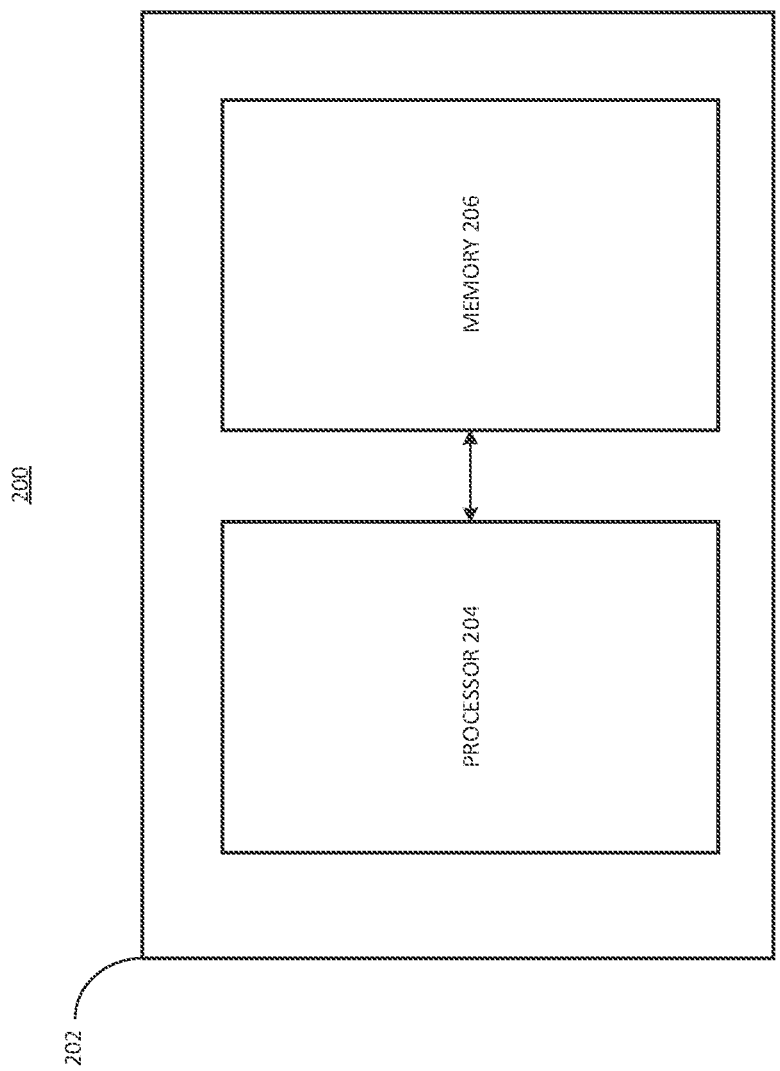
FIG. 2 shows a diagram of an exemplary computing system according to some embodiments of the present disclosure.

FIG. 2 shows a diagram 200 of an exemplary computing system 202 that one or more of devices 102, content storage 106, advertising storage 108, and finalized content storage 110 may use according to some embodiments of the present disclosure. Computing system 202 may be used in client and/or server devices, for example. Those skilled in the art will also recognize how to implement embodiments of the present disclosure using other computer systems or architectures. Computing system 202 may represent, for example, computer device, such as a server, desktop computer, laptop computer, tablet computer, mobile computer, mobile phone (e.g., PDA, cell phone, palmtop, etc.), mainframe, server, client, or any other type of special or general purpose computing device as may be desirable or appropriate for a given application or environment. Computing system 202 can include one or more processors, such as a processor 204. Processor 204 can be implemented using a general or special purpose processing engine such as, for example, a microprocessor, microcontroller or other control logic. Processor 204 can be connected to a bus or other communication medium for interfacing with external entities.

Computing system 202 can also include a memory 206, which may include a random access memory (RAM) or other dynamic memory, for storing information and instructions to be executed by processor 204. Memory 206 also may be used for storing temporary variables or other intermediate information during execution of instructions to be executed by processor 204. Memory 206 may also include a read only memory ("ROM") or other static storage for storing static information and instructions for processor 204. Memory 206 may also include storage which may include, for example, a media drive and/or a removable storage interface. The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. The storage media may include, for example, a hard disk, floppy disk, magnetic tape, optical disk, CD or DVD, or other fixed or removable medium that is read by and written to by the media drive. The storage media may include a computer-readable storage medium having stored therein particular computer software or data.

In this document, the terms "computer program product," "computer-readable medium" and the like may be used generally to refer to physical, tangible media such as, for example, memory 206. These and other forms of computer-readable media may be involved in storing one or more instructions for use by processor 204, to cause the processor to perform specified operations. Such instructions, generally referred to as "computer program code" (which may be grouped in the form of computer programs or other groupings), when executed, enable the computing system 202 to perform features or functions of embodiments of the present disclosure. Note that the code may directly cause the processor to perform specified operations, be compiled to do so, and/or be combined with other software, hardware, and/or firmware elements (e.g., libraries for performing standard functions) to do so.

Figure 3:
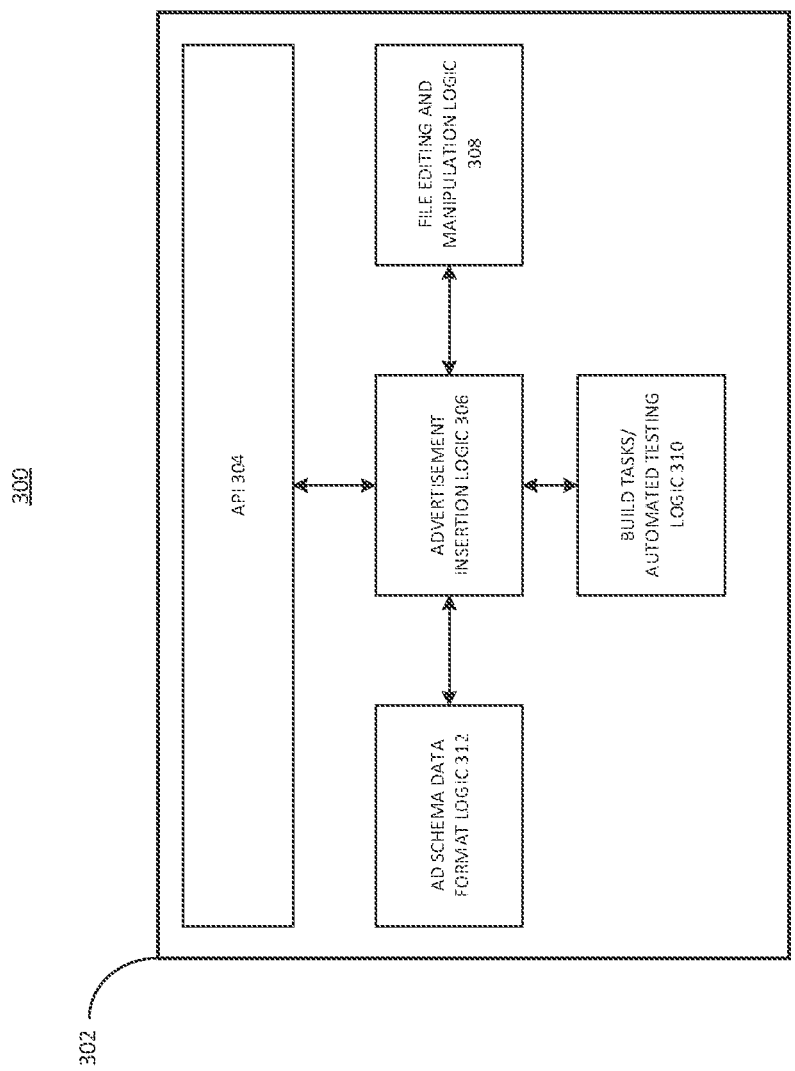
FIG. 3 shows a diagram of an exemplary organization of software that may be executed by a device to provide insertion of advertising content into digital content in accordance with some embodiments of the present disclosure.

FIG. 3 shows a diagram 300 of an exemplary organization of software 302 that may be executed by a device 102 to provide insertion of advertising content into digital content in accordance with some embodiments of the present disclosure. For example, software 302 may include an application programming interface (API) 304 that may allow for communication with other elements of system 100 like other devices 102, content storage 106, advertising storage 108, and finalized content storage 110. API 304 may further provide a medium by which a device 102 may receive and transfer data to other elements of system 100. For example, API 304 may facilitate the reception of advertising content and/or digital content such as audio and video by device 102 via network 104.

Software 302 may include advertisement insertion logic 306. For example, advertisement insertion logic 306 may include logic to perform processes that make decisions as to how and which advertising content is applied to digital content in accordance with embodiments of the present disclosure. For example, advertisement insertion logic 306 may perform processes that determine which advertising content to incorporate with digital content such as audio and video. After processing by advertisement insertion logic 306, instructions for further processing of advertising and digital content may be provided to logic 308.

For example, logic 306 may provide data to logic 308 that directs how logic 308 should operate. Logic 306 may iterate processes over an ad schema object provided to API 304. Logic 306 may then interpret the ad schema using rules set by logic 312 to supply a set of ad insertion tasks to logic 308. Logic 306 may also supply a list of how this logic execution will/has occurred back to API 304, where this list can be used by other devices for further action.

Software 302 may include file editing and manipulation logic 308. For example, file editing and manipulation logic 308 may process, alter, or combine advertising and digital content as instructed by advertisement insertion logic 306 to place it into a format that is suitable for distribution and/or storage. For example, file editing and manipulation logic 308 may combine advertising and digital content and convert the combination into a particular file format and/or file size suitable for distribution and/or storage. For example, file editing and manipulation logic 308 may alter advertising and/or digital content as specified by logic 306 so that the content is in a proper format for one or more particular distribution mediums.

Software 302 may include build tasks/automated testing logic 310. For example, build tasks/automated testing logic 310 may perform testing on combined advertising and digital content output by advertisement insertion logic 306 to ensure such content has one or more of a particular quality, length, and format and is acceptable for distribution. For example, in order to assure that advertising content matches the quality requirements from logic 306, it may also test advertising content stored in advertising storage 108 and/or digital content stored in storage 106. For example, to allow for rapid system deployment and changes the logic 310 may also use files content storage 106 and/or advertising storage 108 and/or supplied by devices external to the system to test and assure quality. To assure that ad trafficking occurs in a desired time and/or without error, logic 310 may also test data objects provided by external devices and processed by logic 306 to assure that they comply with rules provided by data format logic 312, for example.

Software 302 may include ad schema data format logic 312. For example, ad schema data format logic 312 may ensure that such advertising content is correctly configured for combining with digital content.

For example, ad schema data format logic 312 may operate to specify how to communicate operations performed by 306 to other machines via API 304. For example, ad schema data format logic 312 may force commands from other devices that pass through API 304 to logic 312 that do not match the expected format of commands into the expected format required for logic 306 and/or logic 308 to operate properly. For example, logic 312 may provide the processing for logic 306 to properly format the results of its operations to be delivered to user devices or other ad-related devices.

It should be noted that software 302 may be stored on a memory of device 102 and executed by a processor. Moreover, it should be noted that internal cache and other memory space of the memory may be used by software 302 as swap space for performing advertising and/or digital content processing, for example, as well as space for storing intermediate processing files and configuration settings for processing, for example.

Figure 4:
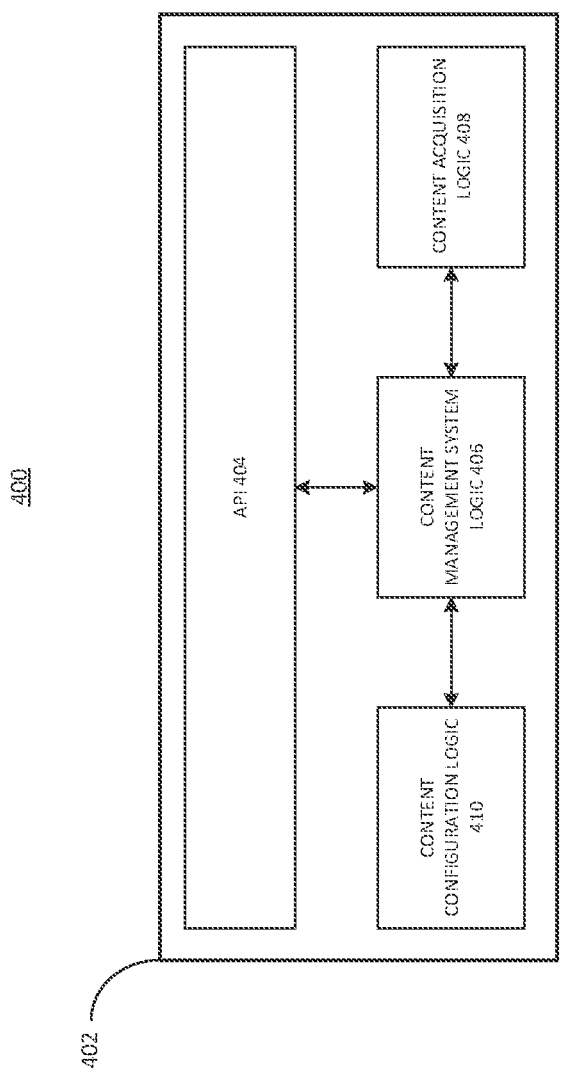
FIG. 4 shows a diagram of an exemplary organization of software that may be executed by content storage to provide insertion of advertising content into digital content in accordance with some embodiments of the present disclosure.

FIG. 4 shows a diagram 400 of an exemplary organization of software 402 that may be executed by a computing device, such as device 102, for example. For example, software 402 may be executed to provide insertion of advertising content into digital content in accordance with some embodiments of the present disclosure. For example, software 402 may include an application programming interface (API) 404 that may allow for communication with other elements of system 100 like other content storage 106, devices 102, advertising storage 108, and finalized content storage 110. API 404 may further provide a medium by which a content storage 106 may receive and transfer data to other elements of system 100. For example, API 404 may facilitate the reception and transmission of digital content such as audio and video by content storage 106 via network 104.

Software 402 may include content management system logic 406. For example, content management system logic 406 may manage digital content such as audio and/or video content that is received from one or more digital content sources. For example, content management system logic 406 may manage one or more podcast files received from a content source, such as a podcast repository. For example, content management system logic 406 may manage processes for users uploading podcast files to content storage 106. Content management system logic 406 may organize where digital content is stored and track status information related to digital content, such as how often it is served for incorporation with advertising content, the type and number of advertising zones included in digital content, and information on advertising content that the digital content has been combined with previously. Content management system logic 406 may also track data that describes digital content for targeting ads like content topic, content author, content key terms, and content transcript, for example.

Software 402 may include content acquisition logic 408. For example, content acquisition logic 408 may be used to acquire digital content from one or more digital content sources. For example, content acquisition logic 408 may request digital content from digital content sources, and may receive digital content in response. For example, content acquisition logic 408 may also be configured to coordinate the reception of unsolicited digital content that is sent to content storage 106. The unsolicited digital content may be content that is sent to content storage 106 unilaterally, and not in response to a request by content acquisition logic 408. Unsolicited content may be, for example, user generated digital content that is sent to content storage 106 unsolicited and not in response to a request from content acquisition logic 408.

Software 402 may include content configuration logic 410. For example, content configuration logic 410 may be used to configure digital content for combination with advertising content. For example, audio and/or video content may be configured using content configuration logic 410 so that it is an acceptable file size, format, and/or quality for combing with advertising content. Content configuration logic 410 may be executed so that digital content is configured such that it has one or more of pre-content, mid-content, and/or post-content advertising zones available for the insertion of advertising content.

For example, content configuration logic 410 may configure a data object that describes the digital content and is transmitted along-side the digital content. By configuring this data object, digital content may be placed into an acceptable file size, format, and/or quality for combing with advertising content, for example. Logic 410 may manage the creation, alteration, and storage of the data object, and may configure the object such that it allows software 302 to pick up the digital content and process it correctly. The interaction(s) between API 304 and logic 404 may be based on the data object, and each computing device 102 in system 100 may have a mechanism for establishing and/or reading this object. Software 302 may use the object configured by logic 410 to determine how to execute logic 308.

Figure 5:
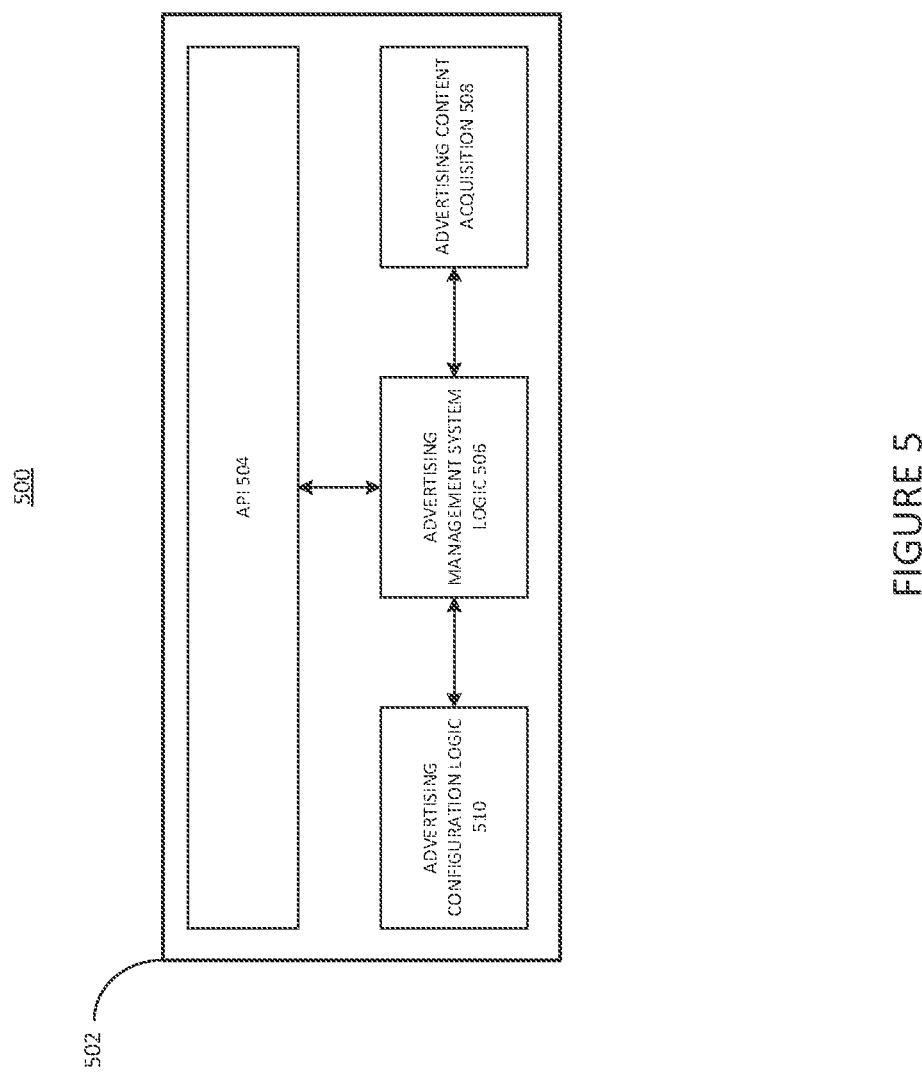
FIG. 5 shows a diagram of an exemplary organization of software that may be executed by advertising storage to provide insertion of advertising content into digital content in accordance with some embodiments of the present disclosure.

FIG. 5 shows a diagram 500 of an exemplary organization of software 502 that may be executed by a computing device, such as device 102, for example. For example, software 402 may be executed to provide insertion of advertising content into digital content in accordance with some embodiments of the present disclosure. For example, software 502 may include an application programming interface (API) 504 that may allow for communication with other elements of system 100 like other advertising storage 108, content storage 106, devices 102, and finalized content storage 110. API 504 may further provide a medium by which an advertising storage 108 may receive and transfer data to other elements of system 100. For example, API 504 may facilitate the reception and transmission of advertising content such as audio, video, and image advertising content by advertising storage 108 via network 104.

Software 502 may include advertising management system logic 506. For example, advertising management system logic 506 may manage advertising content such as audio and/or video advertising content that is received from one or more advertising content sources. For example, content management system logic 506 may manage one or more audio advertising files received from an audio advertising content source, such as an advertisement repository or exchange, for example. Advertising management system logic 506 may organize where advertising content is stored and track status information related to advertising content, such as how often it is served for incorporation with digital content and how fresh the advertising content is. For example, freshness of the advertising content may be reflected by the amount of time that the advertising content has been available for serving for incorporation with digital content.

Software 502 may include advertising content acquisition logic 508. For example, advertising content acquisition logic 508 may be used to acquire advertising content from one or more advertising content sources. For example, advertising content acquisition logic 508 may request advertising content from advertising content sources, and may receive advertising content in response. For example, advertising content acquisition logic 508 may be configured to coordinate the reception of advertising content that is sent to advertising content storage 108, as well as the sending of advertising content from storage 108.

Software 502 may include advertising configuration logic 510. For example, advertising configuration logic 510 may configure advertising content for combination with digital content. For example, audio and/or video advertising content may be configured by advertising configuration logic 510 into an acceptable file size, format, and/or quality for combing with digital content. For example, advertising configuration logic 510 may configure advertising content such that it has a particular playback time length. For example, advertising configuration logic 510 may configure audio advertising content such that the advertising content has a playback time length of 10 seconds. For example, advertising configuration logic 510 may configure video advertising content such that the advertising content has a playback time length of 10 seconds. For example, advertising configuration logic 510 may configure image advertising content such that the advertising content has a playback time length of 10 seconds. For example, advertising configuration logic 510 may configure advertising content such that it is insertable within one or more pre-content, mid-content, and/or post-content advertising zones of digital content.

Figure 6:
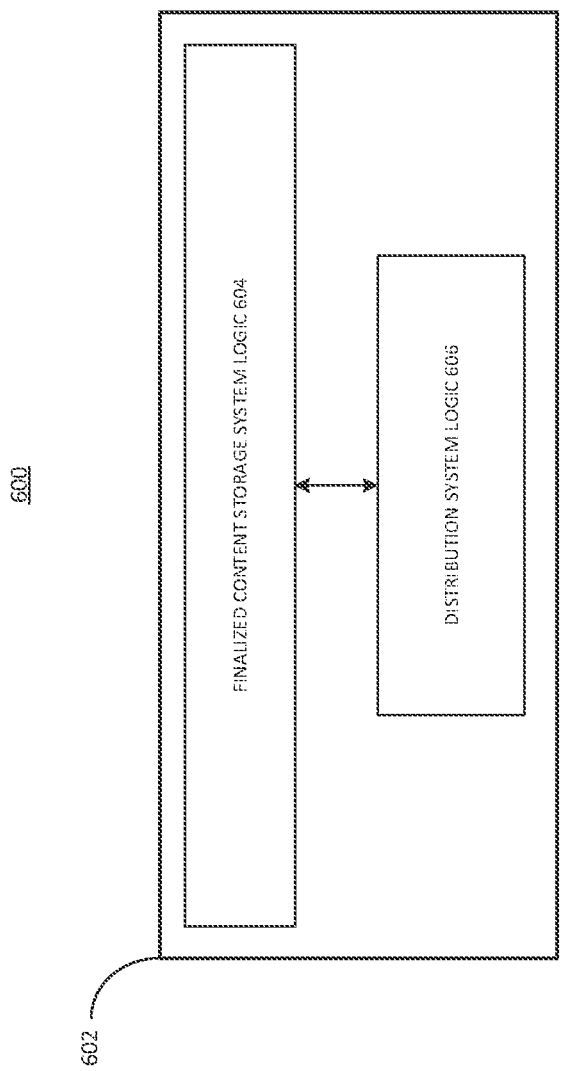
FIG. 6 shows a diagram of an exemplary organization of software that may be executed by finalized content storage in accordance with some embodiments of the present disclosure.

FIG. 6 shows a diagram 600 of an exemplary organization of software 602 that may be executed by a computing device, such as device 102, for example. For example, software 602 may include finalized content storage system logic 604 that may configure and store finalized, combined advertising and digital content output from device 102. For example, finalized content storage system logic 604 may provide the storage of combined advertising and podcast content. The advertising content may, for example, have been stitched into one or more time points of the podcast content during previous processing by device 102. In the combined advertising and digital content, when one or more time points are encountered during playback of the podcast, advertising content may be played for a certain time length. The advertising content may be audio advertising content.

Software 602 may include distribution system logic 606. For example, distribution system logic 606 may provide for the distribution of combined advertising and digital content to client devices for playback and/or repositories for storage, for example. Distribution system logic 606 may configure combined advertising and digital content for transmission and distribution. For example, distribution system logic 606 may ensure that combined advertising and digital content are formatted correctly for transmission and distribution, and may adjust the formatting of combined advertising and digital content as needed depending on the client device and/or repository that the combined content is being sent to.

For example, in some embodiments, distribution system logic 606 may select between combined advertising and digital content and/or content that only includes digital content, based on capabilities and rules of potential distribution platforms.

Figure 7:
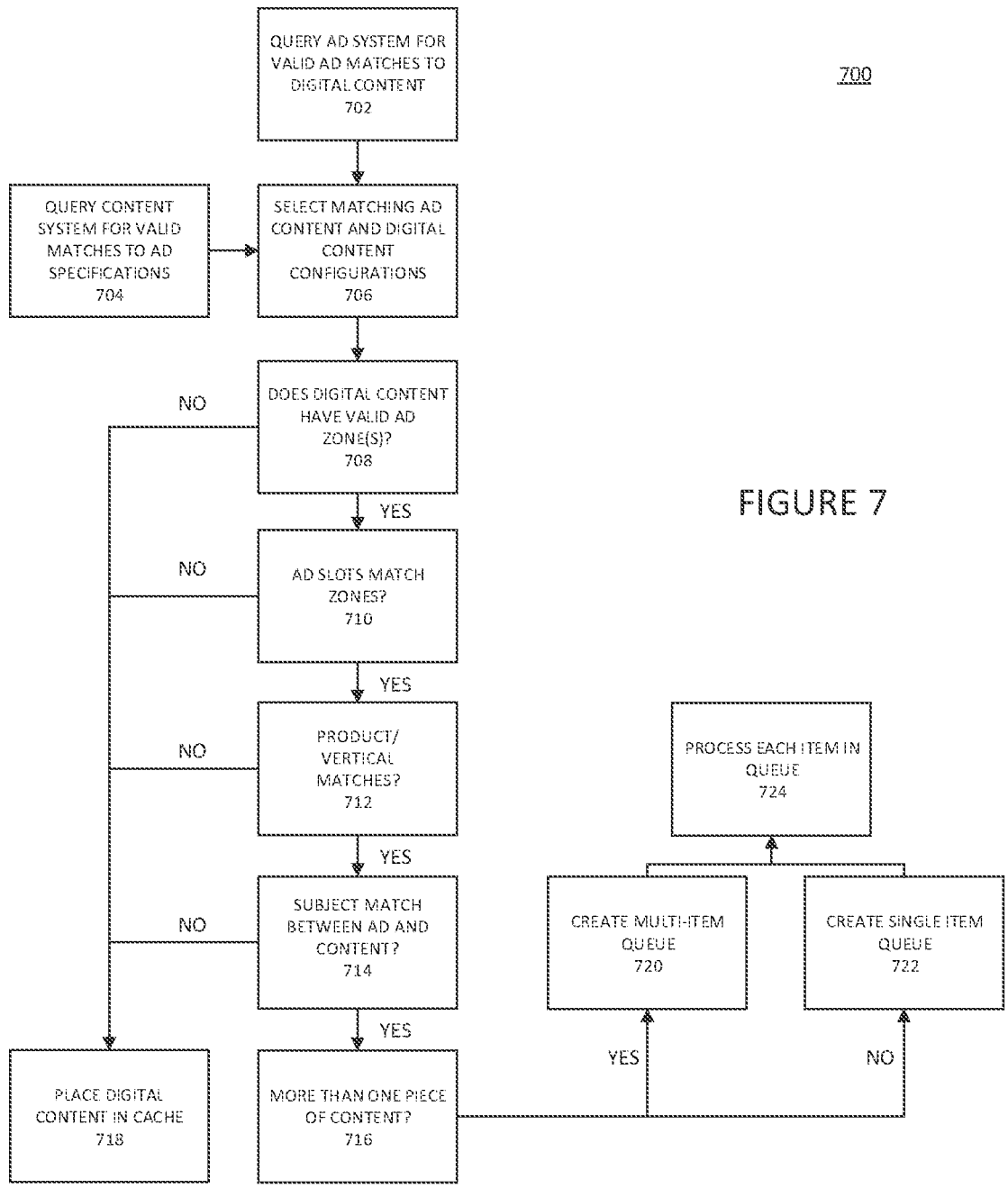
FIG. 7 shows a flow chart of an exemplary process for inserting advertisements into digital content in accordance with some embodiments of the present disclosure.

FIG. 7 shows a flow chart of an exemplary process 700 for inserting advertisements into digital content in accordance with some embodiments of the present disclosure. Process 700 may include a step 702 of querying an advertising system for valid advertising content matches to digital content. The advertising system may include advertising storage 108, for example. Here, advertising content such as video and/or audio advertising content may be analyzed to determine whether it is suitable for combining with digital content, such as video and/or audio content. The analysis may use metadata regarding the advertising and/or digital content. For example, digital and advertising content may be matched based on whether it relates to the same or a similar topic, interest, or preference, or if there is some other similarity between the content. Moreover, formal data requirements may also be analyzed. For example, the analysis may include determining whether the digital and advertising content is compatible for combination, or whether the content is incompatible. For example, the analysis may include determining whether advertising content slot information, length, targeting data, pre-content, post-content, mid-content information, campaign restrictions, location, and/or other configuration data are compatible with digital content. Furthermore, actual subject matter of the advertising content, machine learning tag(s), private metadata, and advertising content file location may be analyzed. The analysis of step 702 may determine a compatibility of the advertising content and digital content. A selection of candidate advertising content that is a potential match may be queued based on the analysis of step 702.

It should also be noted that within step 702, advertising content may be sorted based on a priority. For example, advertising content may have a certain priority which makes it easier to be matched to digital content. For example, even if digital and advertising content are not as strong of a match regarding other aspects, if the advertising content has a high priority, a match may still be determined. This is because the priority indicates a need that the advertising content is used. In contrast, if the advertising content has a low priority, a match may be disregarded if other advertising content has a higher priority, even if the other advertising content is not as strong of a match. Process 700 may include a step 704 of querying a content system for valid matches to advertising content specifications. The content system may be content storage 106, for example. Here, digital content such as video and/or audio content may be analyzed to determine whether it is suitable for combining with advertising content, such as video and/or audio advertising content. The analysis may use metadata regarding the advertising and/or digital content. For example, like in step 702, digital and advertising content may be matched based on whether it relates to the same or a similar topic, interest, or preference, or if there is some other similarity between the content. Moreover, formal data requirements may also be analyzed. For example, the analysis may include determining whether the digital and advertising content is compatible for combination, or whether the content is incompatible For example, the analysis may include determining whether advertising content slot information, length, targeting data, pre-content, post-content, mid-content information, campaign restrictions, location, and/or other configuration data are compatible with digital content. Furthermore, actual subject matter of the digital content, machine learning tag(s), private metadata, and digital content file location may be analyzed. The analysis of step 704 may determine a compatibility of the advertising content and digital content. A selection of candidate digital content that is a potential match may be queued based on the analysis of step 704.

Process 700 may include a step 706 of selecting matching the advertising content and digital content. The selected advertising content may be the queued advertising content from step 702, and the selected digital content may be the queued digital content form step 704. In this step, the advertising content and digital content that provides best match or matches for combination may be selected. For example, a podcast that matches to certain advertising content in terms of subject matter, available advertising slots, and advertising slot time length may be determined. The advertising content and podcast may be selected for combination.

Process 700 may include a step 708 of determining whether the digital content has one or more valid advertising zones. Here, the selected digital content is analyzed to determine whether its advertising zones are valid, or if the advertising zones of the digital content are not compatible with advertising slots of the advertising content. For example, the advertising zones may be locations within the digital content where advertising content may be inserted. For example, a podcast may have advertising zones located at certain time points where there does not exist audio. Advertising content may be inserted into the podcast at these time points. The time points may reflect a certain length of time—for example, 5 seconds, 10 seconds, or 15 seconds. If the digital content has one or more valid advertising zone in step 708, process 700 moves to step 710. If it does not, process 700 moves to step 718. In step 718, the selected digital content is placed in a cache without combining it with advertising content. For example, the cache may be located at content storage 106 or finalized content storage 110. The cache may be a distribution cache, where the digital content is queued for distribution to one or more user devices.

Process 700 may include a step 710 of determining whether one or more advertising slots match the one or more advertising zones of the digital content. For example, the digital content may have one or more corresponding advertising zones specifying time points where advertising content may be placed. However, advertising content may have associated advertising slots that specify the length of the advertisement. Thus, for advertising content to be compatible with digital content, the advertising zones may be required to have a sufficient match with the advertising slots. A match may occur if the sequential timepoints of an advertising zone, specifying a range of time, is long enough to contain an advertising slot. For example, an advertising zone may be 5 seconds. A match may occur if an advertising slot is 5 seconds or less. For example, a match may occur if the advertising zone and the advertising slot specify the same or substantially the same range of time. For example, a match may occur if the advertising zone and the advertising slot specify ranges of time what are within a predetermined amount. For example, if the advertising zone is 5 seconds, a parameter may be set such that advertising slots that are within 2 or less seconds of the 5 second advertising zone is considered a match. Therefore, a 3 second advertising slot may match the 5 second advertising zone.

For example, advertising content can also specify a zone match. For example, advertising content may specify that an advertising slot be pre-content and at least 15 seconds long, so that a pre-content zone that is 15 seconds long would accept the advertising content but neither a pre-content zone that is 10 seconds long nor a post or mid-content zone that is 15 seconds long would accept the advertising content, for example.

For example, advertising content can match multiple advertising slots. For example, advertising content can specify it would match both pre-content and post-content slots, for example, and advertising content can be filled in to both or either slot when both or either are available.

If there is a match in step 710, process 700 moves to step 712. If there is not, process 700 moves to step 718. As noted, in step 718, the selected digital content is placed in a cache without combining it with advertising content.

Process 700 may include a step 712 of determining whether there is a product/vertical match. For example, step 712 may include determining if advertising content matches digital content based on advertising sale(s). For example, the advertising content may be targeted specifically to be associated with a particular digital content. For example, the advertising content may have entered advertising storage 108 due to a direct sale in which its placement was guaranteed against a specific type or category of digital content in storage 106. For example, advertising content may be in-house advertising content which is specifically designed to be placed before, within, and/or after a specific piece of digital content.

Digital content may have one or more meta-data tags that specify it as a certain type of content (such as a show), a content product, or vertical category that contains one or multiple other categories. For example, the vertical category might be a parent topic like "Business," for example, that contains other topics like "Innovation" or "Money," for example. For example, the advertising content may target all of that vertical business category. For example, the advertising content may be directed to all member episodes of a podcast show on the basis of targeting just a single show. Thus, for example, if advertising content's specification for a show or vertical category matches the specification of the digital content as a member of that show or vertical category, then there would be a match.

If there is a match in step 712, process 700 moves to step 714. If there is not, process 700 moves to step 718. As noted, in step 718, the selected digital content is placed in a cache without combining it with advertising content.

Process 700 may include a step 714 of determining whether there is a subject match between the advertising content and digital content. For example, keyword and/or topic data of the advertising content and digital content may be analyzed to determine whether a match exists. For example, advertising and/or digital content may be automatically analyzed to determine a match. For example, a match may exist is similar or the same keyword and/or topic data is present in both the advertising and digital content. For example, one or more keyword tags regarding a podcast may be related to sports. Audio advertising content may also have one or more keyword tags relating to sports. Therefore, in step 714, the podcast and audio advertising content may be considered a match. It should be noted that in step 714, a match may be determined even if there is only a limited match. For example, an advertising slot may be open and advertising content may be needed. A match may still be determined, and advertising content that does not necessarily match the podcast may still be selected in step 714. For example, a low-value advertisement may be selected.

If there is a match in step 714, process 700 moves to step 716. If there is not, process 700 moves to step 718. As noted, in step 718, the selected digital content is placed in a cache without combining it with advertising content.

Process 700 may include a step 716 of determining whether more than one piece of digital content is provided. For example, more than one video and/or audio content may have matched to advertising content. If there is more than one piece of content combined having associated advertising content, process 700 moves to step 720. If there is not more than one piece of content, process 700 moves to step 722.

Process 700 may include a step 720, where a multi-item content queue is formed. Here, advertising content of the candidate advertising content may be selected. Multiple pieces of video and/or audio content may be selected and matched to the selected advertising content. The multiple pieces may be matched to the same or different advertising content. A queue may be formed with each of these pieces and their associated matching advertising content. Each piece from the queue with its associated matching advertising content may be processed in step 724. For example, the queue could include a first podcast with associated matching advertising content, a second podcast with associated matching advertising content, and video with associated matching advertising content. For example, one piece of digital content may be associated with multiple advertising content. For example, a first podcase may be associated with a first matching advertising content, as well as a second matching advertising content that is different to the first. The first matching advertising content may be associated with a first advertising slot, such as a pre-content advertising slot, for example. The second matching advertising content may be associated with a second advertising slot, such as a post-content advertising slot, for example.

Process 700 may include a step 722, where a single item content queue is formed. Here, advertising content of the candidate advertising content may be selected. Only a single piece of video and/or audio content is selected and matched to the selected advertising content. A queue may be formed with only the single piece along with its matched advertising content. The single piece with its associated matching advertising content may be processed in step 724. For example, the queue could include a first podcast with associated matching advertising content.

Figure 8:
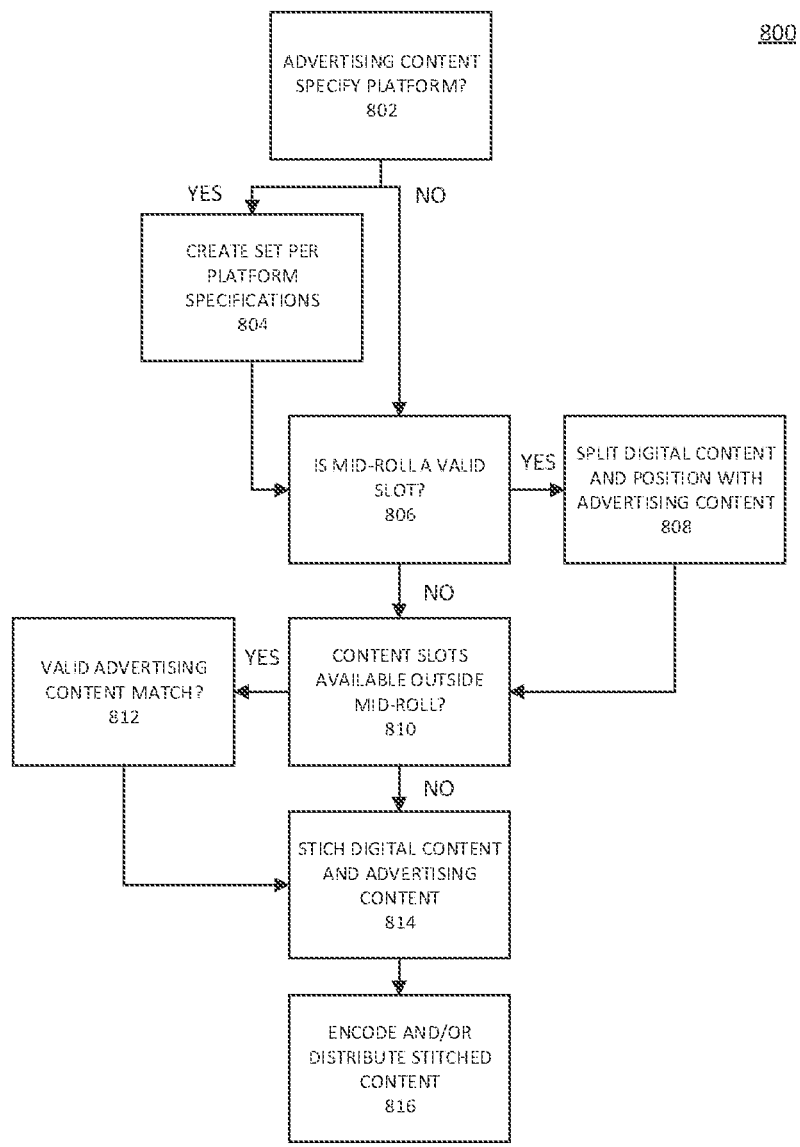
FIG. 8 shows a flow chart of an exemplary process associated with inserting advertisements into digital content in accordance with some embodiments of the present disclosure.
Figure 9:
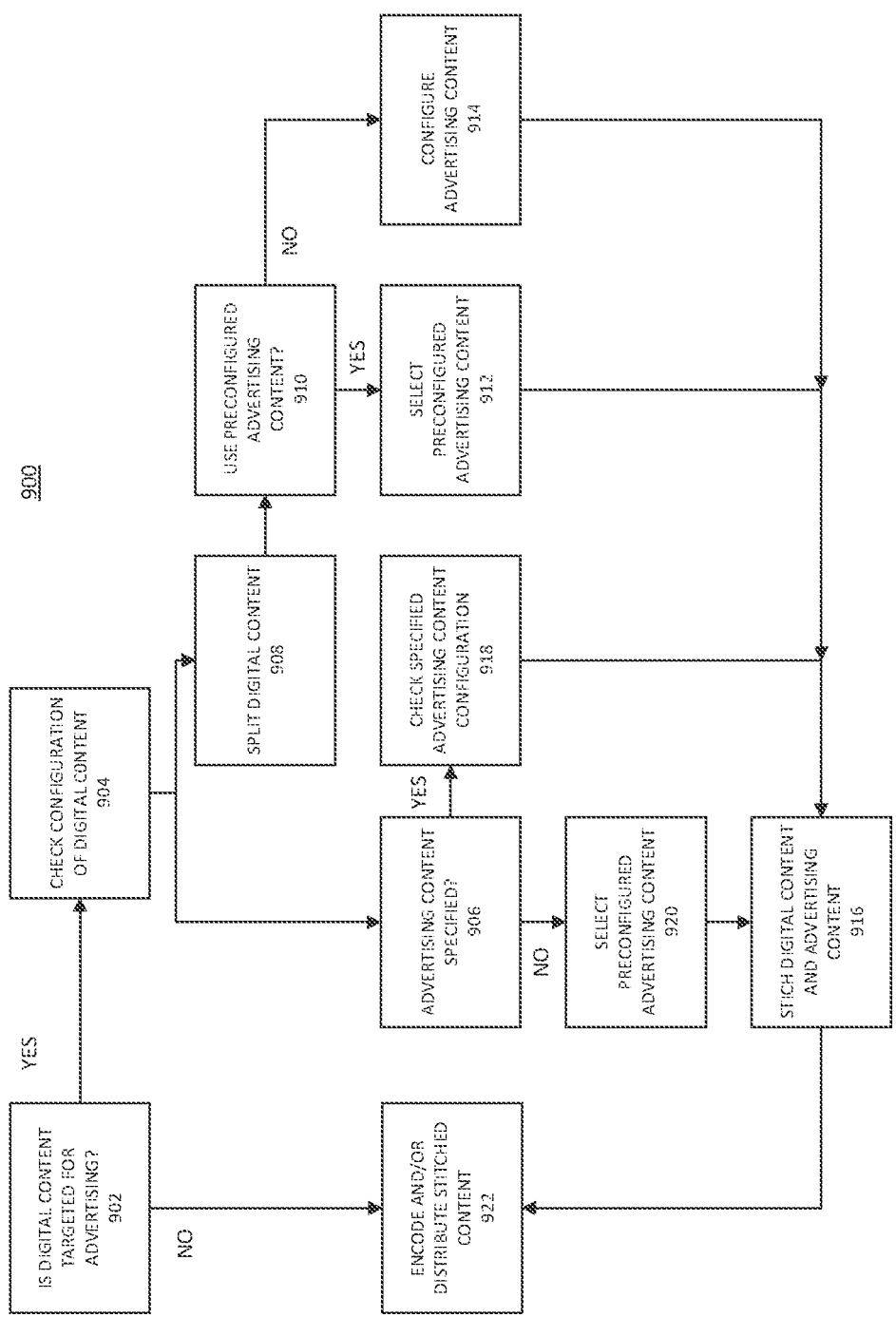
FIG. 9 shows a flow chart of an exemplary process associated with inserting advertisements into digital content in accordance with some embodiments of the present disclosure.

Process 700 may include a step 724, where each piece of digital content and associated matching advertising content is processed to form a stitched, combined content. FIGS. 8 and 9 show flow charts that reflect the processes that may take place within step 724 of process 700. FIG. 8 shows a flow chart of an exemplary process 800 associated with inserting advertisements into digital content in accordance with some embodiments of the present disclosure. For example, process 800 may reflect the processes that may take place within step 724 of process 700.

Process 800 may include a step 802 of determining whether the advertising content for combination with digital content specifies one or more particular platforms for distribution. For example, the advertising content may specify a particular webpage type, player, and/or other distribution platform on which it can be configured for. For example, advertising content may specify that it can be configured for a particular device or software player. If a distribution platform is specified, then process 800 continues to step 804. If not, then process 800 continues to step 806.

Process 800 may include a step 804 of creating a set that contains advertising content and associated distribution content that specify a distribution platform. The set may be configured in accordance with the platform specification(s) determined in step 802. For example, when advertising content specifies that it can be configured for a particular podcast player, then the advertising content and associated digital content it is matched to may be configured for playback by the particular player. In another example, the set may be configured in accordance with the platform specification(s) determined in step 802 and also a general platform specification. For example, the advertising content may specify that it can be configured for a particular podcast player as well as a general player, and the advertising content and associated digital content it is matched to may be configured for playback by the particular player and general player. Process 800 may then continue to step 806.

Process 800 may include a step 806 of determining whether there are one or more valid mid-content slots for advertising content within the digital content. For example, the digital content may be analyzed to check whether an advertising zone is included at one or more time points within the digital content and not before (pre-content) or after (post-content) the digital content. In such a case, the advertising zone would be considered as allowing a mid-content advertising slot. If there is a valid mid-content slot, then process 800 continues to step 808. If there is not, process 800 continues to step 810.

Process 800 may include a step 808 of splitting the digital content and positioning the digital content with advertising content. Here, the digital content may be split according to where one or more mid-content advertising zones and/or slots are located. For example, a time point of the mid-content advertising zone and/or slot may be determined where a split should occur. The time point may be a time at which playback of the advertising content inserted into the mid-content zone should start. The digital content may be split such that a first portion is located before time point and a second portion is located after the time point. The matched advertising content may then be positioned with the digital content by being inserted between the first portion and second portion. In step 808, digital content may be split into two or more portions, and advertising content may be positioned between the two or more portions. For example, each of the two or more portions may be stored in a cache. It should be noted that this process may be performed multiple times when there are multiple mid-content advertising zones and/or slots, for each of the mid-content advertising zones and/or slots that are present.

Process 800 may include a step 810 of determining whether other there are one or more valid slots other than the mid-content slot(s) for advertising content within the digital content. For example, the slots at issue here may be pre-content slots or post-content slots. For example, the digital content may be analyzed to determine if there are advertising zones that provide one or more pre-content slots and/or one or more post-content slots for advertising content. Process 800 may continue to step 812 is there are slots other than the mid-content slot(s). If there are not, process 800 may continue to step 814.

Process 800 may include a step 812 of determining if there is a valid advertising content match to the non-mid-content slot(s) identified in step 810. For example, advertising content may be analyzed to determine if it is compatible with the non-mid-content slot(s).

Process 800 may include a step 814 of stitching digital content and advertising content. Here, advertising content may be combined with digital content by stitching the two together. For example, where a mid-content slot is present, digital content may be split into two or more portions as noted in step 808. Advertising content may be positioned between the two or more portions by inserting it between the two or more portions. The inserted advertising content may then be stitched to the portions such that a combined digital and advertising content is formed. For example, where a non-mid-content slot is present, such as a pre-content or post-content slot, advertising content may be positioned adjacent to the digital content by inserting it into either or both of the slots. The inserted advertising content may then be stitched to the digital content such that a combined digital and advertising content is formed. In another example, both mid-content and non-mid-content slots may be present. In such a case, digital content may be split into two or more portions as noted in step 808. Advertising content may be positioned between the two or more portions by inserting it between the two or more portions. The inserted advertising content may then be stitched to the portions. In addition, advertising content may be positioned adjacent to the digital content in pre-content and/or post-content slots by inserting it into either or both of the slots. The inserted advertising content may then be stitched to the digital content.

For example, stitching may include determining a time point of the digital content at which playback of the advertising content should start. The advertising content may be stitched to this time point such that playback of it starts at the time point.

Process 800 may include a step 816 of encoding and/or distributing stitched content. For example, the combined digital and advertising content, which is the stitched content, may be encoded into a particular file format and/or size for distribution. For example, for one or more files of stitched content, a determination may be made as to one or more of the target transmission destinations for each of these files. The destination may be a target folder name or target storage device, for example. The one or more stitched content files may be transmitted to storage, and may be distributed further from the storage. The storage may be finalized content storage 110, for example. The storage may be a server, for example. The storage may be remote storage, for example. The transmission destination may be specified by the digital content that forms the stitched content and/or the advertising content that forms the stitched content.

For example, a content management system may specify one or more transmission destinations for stitched content in destination data associated with the selected digital content. The content management system may be formed by content management system logic 406 of content storage 106, for example. In another example, an advertising management system may specify one or more transmission destinations for stitched content. The advertising management system may be formed by advertising management system logic 506 of advertising storage 108, for example.

For example, the content management system may specify that a particular podcast must be transmitted to one or more data repositories. Once in the data repository, the podcast may be distributed to other entities. For example, an API JavaScript object notation (JSON) statement may be built for a particular piece of digital content to describe the transmission destination(s) specified by the content management system. The JSON statement may be transmitted to one or more of the specified transmission destinations, indicating that each of the one or more destinations should request a download of the stitched content including the digital content. The destination(s) may then request the stitched content and receive it for storage and further distribution if desired.

A similar process may occur regarding advertising content. In particular, the advertising management system may specify that a particular advertising content must be transmitted to a one or more data repositories so it has a particular change of contacting users of interest. This specification may be made in destination data associated with the selected advertising content. Once in the data repository, the advertising content (along with its stitched digital content) may be distributed to other entities. For example, an API JavaScript object notation (JSON) statement may be built for a particular piece of advertising content to describe the transmission destination(s) specified by the advertising management system. The JSON statement may be transmitted to one or more of the specified transmission destinations, indicating that each of the one or more destinations should request a download of the stitched content including the advertising content. The destination(s) may then request the stitched content and receive it for storage and further distribution if desired. It should be noted that this process may occur for the same stitched content; in other words, the stitched content may be transmitted to transmission destinations at the direction of a content management system and an advertising management system.

Metric data may be transmitted to an advertising management system, such as the system formed by advertising management system logic 506 of advertising storage 108, for example. The metric data may indicate, for example, the advertising content, transmission destination of the advertising content, advertising slot (e.g., pre-content, post-content, mid-content), advertising length, and/or any other relevant information regarding the advertising content. For example, the metric data may specify the time of stitching, or events indicating that content has been stitched and delivered to a particular device, both in degree of type and in degree of additional specificity down to an individual user, for example. The advertising management system may track advertising content using the metric data. The tracking may provide insight on advertising trends and/or advertising efficacy, for example.

For example, in step 816, the stitched content may be formatted for transmission to the transmission location. For example, the stitched content may be converted to a particular file format, file size, or the like such that transmission may occur.

FIG. 9 shows a flow chart of an exemplary process 900 associated with inserting advertisements into digital content in accordance with some embodiments of the present disclosure. For example, process 900 may reflect the processes that may take place within step 724 of process 700. It should be noted that the elements of flow charts 800 and 900 may be combined, and one or more steps from one chart may be incorporated into the other chart.

Process 900 may include a step 902 of determining whether digital content is targeted for advertising. For example, advertising content management system formed by advertising content management system logic 506, for example, may determine that certain digital content, based on topic, keyword, target demographic, or the like of the digital content, should or should not be combined with advertising content. For example, if the digital content is tagged with a specified topic, keyword, target demographic, or the like specified by the advertising content management system, then the digital content may be targeted for advertising content and selected form candidate digital content. If digital content is targeted for advertising, the digital content may be selected and process 900 may move to step 904. If it is not, then the digital content may not be targeted for digital advertising and process 900 may move to step 922. In step 922, digital content may be encoded and/or distributed to one or more transmission destinations as described with respect to step 816 in FIG. 8.

Process 900 may include a step 904 of checking a configuration of the digital content. For example, the digital content may be analyzed to determine whether there is are one or more post-content, pre-content, and/or mid-content zones available for advertising slots in the digital content. A determination may also be made as to whether one or more mid-content split locations for splitting digital content and inserting advertising content mid-content are present. If one or more of the mid-content split locations are present, the digital content may proceed to step 908.

Process 900 may include a step 908 of splitting digital content. The splitting of step 908 may be as described as discussed with respect to step 808 in FIG. 8.

Process 900 may include a step 910 of determining whether the advertising content for combining with the digital content has been preconfigured for combining, or whether it should be configured for combining. For example, the advertising content may have previously been configured for combining with the digital content, having its format, length, and size, for example, adjusted such that it can be combined with the digital content. If the advertising content has been previously configured, then process 900 moves to step 912. If it has not, process 900 moves to step 914.

Process 900 may include a step 912, where the preconfigured advertising content is selected for combining with the digital content.

Process 900 may include a step 916, where the selected advertising content and digital content is combined by stitching them together. The stitching of step 916 may be as described as discussed with respect to step 814 in FIG. 8. The stitching of step 916 may include additional queries to 108 via the process described in FIG. 800 in order to find externally specified advertising content from the software specified in 500.

Process 900 may include a step 914 if preconfigured advertising content is not to be used. In step 914, advertising content may be configured for combining with the digital content. For example, the advertising content may be configured for combining with the digital content by having its format, length, and size, for example, adjusted such that it can be combined with the digital content.

Process 900 may include a step 906 of determining if advertising content is specified after step 904. For example, it may be determined whether the advertising content associated with the digital content is valid, and whether it is still combinable with the digital content or if a different piece of advertising content should instead be used. In some embodiments, for example, a command may be received from a content management system like the one described in system 400 to overwrite or add in advertising content that has not been specified by advertising configuration logic 510 and is not associated with storage 108 but instead delivered from content storage 106.

If the advertising content is specified, then process 900 continues to 918. If it is not, then preconfigured advertising content may be selected for combining with the digital content at step 920, and may be stitched with the digital content in step 916 as described.

Process 900 may include a step 918 of checking the specified advertising content configuration to confirm the advertising content is combinable with the digital content. Process 900 may then continue to step 916 for stitching of the advertising content with the digital content.

Process 900 may include a step 922 of encoding and/or distributing the stitched content. The encoding and/or distribution of step 922 may be as described as discussed with respect to step 816 in FIG. 8.

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices. Moreover, each program is may be implemented in a high level procedural or object-oriented programming language to communicate with one or more computer systems. However, the programs can be implemented in assembly or machine language, if desired. In any case, the language may be a compiled or interpreted language.

It should also be noted that the recited processes of the current disclosure are exemplary and may include all recited steps, or may include only a subset of the recited steps. For example, one or more steps of the recited processes may be skipped.

At this point it should be noted that techniques for inserting advertising content into digital content of the present disclosure as described above may involve the processing of input data and the generation of output data to some extent. This input data processing and output data generation may be implemented in hardware or software. For example, specific electronic components may be employed in a server or similar or related circuitry for implementing the functions associated with the embodiments of the present disclosure as described above. Alternatively, one or more processors operating in accordance with instructions may implement the functions associated with the embodiments of the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for electronically combining advertising audio content with digital audio content, the system comprising:
    a computer processor; and
    a memory storing instructions that, when executed by the computer processor, cause the computer processor to:
        electronically perform a compatibility analysis between advertising audio content and digital audio content;
        electronically select candidate advertising audio content from an advertising storage device and candidate digital audio content from a content storage device based on the compatibility analysis;
        electronically detect whether the candidate digital audio content includes an advertising zone specifying a range of time where advertising audio content may be inserted;
        electronically detect whether an advertising slot of the candidate advertising audio content has a length of time that is equal to or less than the range of time;
        when the candidate digital audio content is electronically detected to include an advertising zone specifying a range of time where advertising audio content may be inserted and an advertising slot of the candidate advertising audio content is electronically detected to have a length of time that is equal to or less than the range of time:
            electronically select a piece of digital audio content that includes the advertising zone from the candidate digital audio content;
            electronically select advertising audio content corresponding to the advertising slot from the candidate advertising audio content;
            electronically generate finalized audio content by inserting the advertising audio content corresponding to the advertising slot into the advertising zone of the selected piece of digital audio content;
            electronically format the finalized audio content for transmission to a transmission location; and
            electronically store the finalized audio content in a finalized content storage device; and
        when the candidate digital audio content is electronically detected to not include an advertising zone specifying a range of time where advertising audio content may be inserted or an advertising slot of the candidate advertising audio content is electronically detected to not have a length of time that is equal to or less than the range of time:
            electronically queue the candidate digital audio content in a cache memory for distribution to one or more user devices.

2. The system of claim 1, wherein, when the instructions cause the computer processor to electronically generate the finalized audio content, the instructions further cause the computer processor to electronically stitch the advertising audio content corresponding to the advertising slot and the selected piece of digital audio content together at a specified time point of the selected piece of digital audio content.

3. The system of claim 2, wherein the candidate digital audio content is a podcast.

4. The system of claim 1, wherein the instructions further cause the computer processor to:
    electronically detect that the advertising slot is a mid-content advertising slot.

5. The system of claim 4, wherein, when the instructions cause the computer processor to electronically generate the finalized audio content, the instructions further cause the computer processor to electronically determine a first time point of the advertising zone at which to split the selected piece of digital audio content into a first portion and a second portion.

6. The system of claim 5, wherein, when the instructions cause the computer processor to electronically generate the finalized audio content, the instructions further cause the computer processor to electronically insert the advertising audio content corresponding to the advertising slot between the first portion and the second portion, and electronically stitch the advertising audio content corresponding to the advertising slot to the first portion and the second portion to form the finalized audio content.

7. The system of claim 1, wherein, when the instructions cause the computer processor to electronically perform the compatibility analysis, the instructions cause the computer processor to electronically compare metadata of the advertising audio content with metadata of the digital audio content.

8. The system of claim 1, wherein the instructions, when executed by the computer processor, further cause the computer processor to electronically determine the transmission location for the finalized audio content using destination data associated with the selected piece of digital audio content.

9. The system of claim 1, wherein the instructions further cause the computer processor to electronically select the piece of digital audio content because the piece of digital audio content is targeted for advertising audio content.

10. A method for electronically combining advertising audio content with digital audio content comprising:
- electronically performing a compatibility analysis between advertising audio content and digital audio content;
- electronically selecting candidate advertising audio content from an advertising storage device and candidate digital audio content from a content storage device based on the compatibility analysis;
- electronically detecting whether the candidate digital audio content includes an advertising zone specifying a range of time where advertising audio content may be inserted;
- electronically detecting whether an advertising slot of the candidate advertising audio content has a length of time that is equal to or less than the range of time;
- when the candidate digital audio content is electronically detected to include an advertising zone specifying a range of time where advertising audio content may be inserted and an advertising slot of the candidate advertising audio content is electronically detected to have a length of time that is equal to or less than the range of time:
  - electronically selecting a piece of digital audio content that includes the advertising zone from the candidate digital audio content;
  - electronically selecting advertising audio content corresponding to the advertising slot from the candidate advertising audio content;
  - electronically generating finalized audio content by inserting the advertising audio content corresponding to the advertising slot into the advertising zone of the selected piece of digital audio content;
  - electronically formatting the finalized audio content for transmission to a transmission location; and
  - electronically storing the finalized audio content in a finalized content storage device; and
- when the candidate digital audio content is electronically detected to not include an advertising zone specifying a range of time where advertising audio content may be inserted or an advertising slot of the candidate advertising audio content is electronically detected to not have a length of time that is equal to or less than the range of time:
  - electronically queueing the candidate digital audio content in a cache memory for distribution to one or more user devices.

11. The method of claim 10, wherein the combining comprises electronically stitching the advertising audio content corresponding to the advertising slot and the selected piece of digital audio content together at a specified time point of the selected piece of digital audio content.

12. The method of claim 11, wherein the candidate digital audio content is a podcast.

13. The method of claim 10, wherein the method further comprises:
- electronically detecting that the advertising slot is a mid-content advertising slot.

14. The method of claim 13, wherein electronically generating the finalized audio content comprises determining a first time point of the advertising zone at which to split the selected piece of digital audio content into a first portion and a second portion.

15. The method of claim 14, wherein electronically generating the finalized audio content comprises electronically inserting the advertising audio content corresponding to the advertising slot between the first portion and the second portion, and electronically stitching the advertising audio content corresponding to the advertising slot to the first portion and the second portion to form finalized audio content.

16. The method of claim 15, wherein the method further comprises electronically determining the transmission location for the finalized audio content using destination data associated with the selected piece of digital audio content.

17. The method of claim 10, wherein the piece of digital audio content is electronically selected because the piece of digital audio content is targeted for advertising audio content.

18. A non-transitory processor readable storage media storing instructions for electronically combining advertising audio content with digital audio content comprising:
- electronically performing a compatibility analysis between advertising audio content and digital audio content;
- electronically selecting candidate advertising audio content from an advertising storage device and candidate digital audio content from a content storage device based on the compatibility analysis;
- electronically detecting whether the candidate digital audio content includes an advertising zone specifying a range of time where advertising audio content may be inserted;
- electronically detecting whether an advertising slot of the candidate advertising audio content-has a length of time that is equal to or less than the range of time;
- when the candidate digital audio content is electronically detected to include an advertising zone specifying a range of time where advertising audio content may be inserted and an advertising slot of the candidate advertising audio content is electronically detected to have a length of time that is equal to or less than the range of time:
  - electronically selecting a piece of digital audio content that includes the advertising zone from the candidate digital audio content;
  - electronically selecting advertising audio content corresponding to the advertising slot from the candidate advertising audio content;
  - electronically generating finalized audio content by inserting the advertising audio content corresponding to the advertising slot into the advertising zone of the selected piece of digital audio content;
  - electronically formatting the finalized audio content for transmission to a transmission location; and
  - electronically storing the finalized audio content in a finalized content storage device; and
- when the candidate digital audio content is electronically detected to not include an advertising zone specifying a range of time where advertising audio content may be inserted or an advertising slot of the candidate advertising audio content is electronically detected to not have a length of time that is equal to or less than the range of time:
  - electronically queueing the candidate digital audio content in a cache memory for distribution to one or more user devices.

19. The system of claim 1, wherein the instructions further cause the computer processor to:

electronically detect whether there is a subject matter match between the candidate advertising audio content and the candidate digital audio content and, if not, electronically queue the candidate digital audio content in a cache memory for distribution to the one or more user devices.

20. The system of claim 1, wherein the instructions further cause the computer processor to:
electronically detect whether there is a product/vertical match between the candidate advertising audio content and the candidate digital audio content and, if not, electronically queue the candidate digital audio content in a cache memory for distribution to the one or more user devices.

21. The method of claim 10, wherein the method further comprises:
electronically detecting whether there is a subject matter match between the candidate advertising audio content and the candidate digital audio content and, if not, electronically queueing the candidate digital audio content in a cache memory for distribution to the one or more user devices.

22. The method of claim 10, wherein the method further comprises:
electronically detecting whether there is a product/vertical match between the candidate advertising audio content and the candidate digital audio content and, if not, electronically queueing the candidate digital audio content in a cache memory for distribution to the one or more user devices.

* * * * *